T. C. DAVIS.
NON-SKIDDING ATTACHMENT FOR WHEELS.
APPLICATION FILED NOV. 14, 1916.
1,278,605.
Patented Sept. 10, 1918.
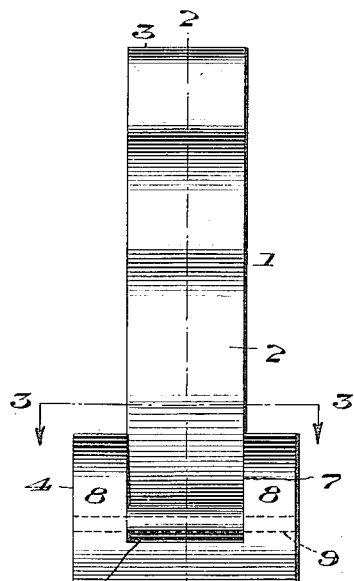
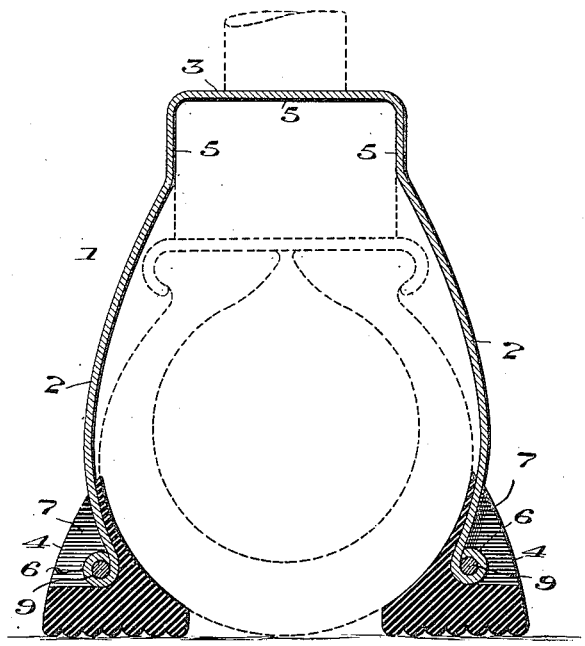
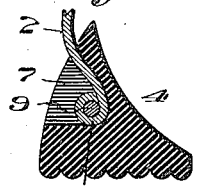
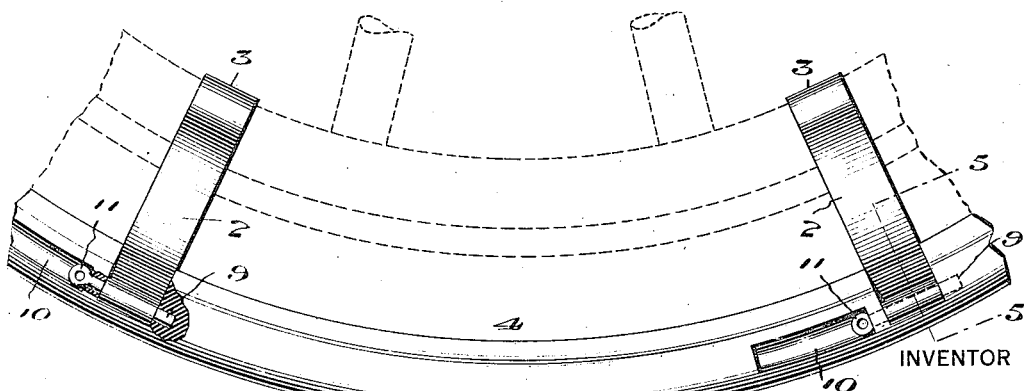
INVENTOR
Thomas Carroll Davis
BY
Diedersheim + Fairbanks
ATTORNEYS

UNITED STATES PATENT OFFICE.

THOMAS CARROLL DAVIS, OF PHILADELPHIA, PENNSYLVANIA.

NON-SKIDDING ATTACHMENT FOR WHEELS.

1,278,605.   Specification of Letters Patent.   Patented Sept. 10, 1918.

Application filed November 14, 1916. Serial No. 131,241.

*To all whom it may concern:*

Be it known that I, THOMAS CARROLL DAVIS, a citizen of the United States, residing in the city and county of Philadelphia, State of Pennsylvania, have invented a new and useful Non-Skidding Attachment for Wheels, of which the following is a specification.

My invention consists of a non-skidding attachment, applicable to the tire of a wheel, composed of shoes adapted to engage with a road bed, and a carrier for said shoes which is composed of a resilient saddle adapted to clasp the felly of the wheel and hold the shoes reliably in operative position on the tire of the wheel, said carrier being conveniently applicable to and removable from said felly and tire, the attachment being devoid of bolts, screws, or other securing devices as such.

The invention is satisfactorily illustrated in the accompanying drawings, but the important instrumentalities thereof may be varied, and so it is to be understood that the invention is not limited to the specific details shown and described.

Figure 1 represents a side elevation of a non-skidding attachment for a tire embodying my invention.

Fig. 2 represents a section thereof on line 2—2 Fig. 1 a tire being shown in dotted lines.

Fig. 3 represents a horizontal section on line 3—3 Fig. 1.

Fig. 4 represents a side elevation of a portion of another embodiment of the invention.

Fig. 5 represents a section thereof on line 5—5 Fig. 4 on an enlarged scale.

Similar numerals of reference indicate corresponding parts in the figures.

Referring to the drawings.

1 designates a stirrup which is composed of a suitable bar or piece of metal bent into shape so as to straddle the felly and rubber tire of a wheel, it consisting of the side legs 2, and the head or crown portion 3 which connects said legs 2, the ends of the legs opposite to said head being free and having connected therewith the shoes 4 which are formed preferably of pliable resilient material, such as soft rubber, their faces which engage a road bed being serrated or roughened so as to take firm hold of the latter as the wheel revolves.

The portion of the legs 2 adjacent to the head 3 are inturned forming an inverted U-shape member 5 which is adapted to embrace the inner periphery and sides of the felly, and the legs extend from said member along opposite peripheral portions of the tire, their terminals turning in toward said peripheries so as to press the shoes 4 firmly against said peripheral portions adjacent to the tread of the tire, the stirrup thus firmly straddling and clasping the felly and tire, and so retaining the shoes in close frictional contact with the tire and holding them, when the wheel rotates, in frictional contact with the road bed whereby skidding of the wheel is prevented.

In order to connect the shoes with the legs the free or terminal portions of the latter are formed with transversely-extending sleeves 6 thereon, and the exterior portions of the shoes are formed with recesses 7 in which said sleeves are received, said recesses being open at the top for that purpose. Pins 9 are passed through said sleeves into the opposite side walls 8 of the recesses 7 thus connecting the shoes with said sleeves, and consequently with the stirrup, and vice versa, and allowing the shoes to turn on said pins to conform to inequalities of the ground, while said walls 8 of the recesses 7 serve also to prevent shifting of the shoes on the ends of the stirrups, said walls acting as shoulders.

It is evident that the stirrups are located on the wheel between the spokes thereof and the attachment may be readily applied to and removed from the wheel by proper manipulation of the stirrups, the latter yielding to superior force, so as to bend and be slipped over the tire and felly in either direction.

The shoes may be made continuous so as to extend entirely around a wheel, a portion of one of which is shown in Fig. 4, in which case the stirrups are detachably connected at intervals with such shoe so that they may be disengaged from the shoe and drawn out from between the spokes of the wheel and afterward returned between the spokes to their positions and reconnected with the shoe.

In this case, the inner face of said shoe has at intervals therein the recesses 10 which extend laterally from the pins 9 employed to occupy the sleeves 6 and portions of the shoe at the sides of the sleeves 6, so that said pins may be placed in said recesses, moved longitudinally therein and so directed into the sleeves 6 thereby connecting the shoe with the stirrups, When it is desired to remove the attachment, the pins are drawn out from the sleeves and drawn into the recesses or grooves 10 whereby they emerge from the sleeves and thus the shoe is disconnected from the stirrups when the latter with the opposite shoe are removable from the felly as in the previous case. To assist in operating the pins 9 they are formed with eyes 11 for the engagement of a hook or other implement, the effect of which is evident.

Owing to the inherent resiliency of the members of the saddle, the attachment may be held in place on a wheel without the employment of bolts, screws, or similar fastening or securing devices.

The pins shown in Figs. 1, 2, and 3 may be drawn out of the shoes and sleeves when it is desired to remove said shoes in order to dismember the device, or for other purposes requiring the same, and as evident either shoe may be removed without disturbing the other for repairs or substitution of another shoe of the kind.

It will be seen from the foregoing that under side thrust on the wheel the tire will move or jam against the shoe located at one side of the tire depending on the direction of thrust thereby increasing frictional contact with the road and prevent side skidding.

Having thus described my invention what I claim as new and desire to secure by Letters Patent, is:—

1. In a non-skidding attachment for a wheel, a stirrup of resilient material connectible with a felly of the wheel, a sleeve on the terminal of a leg of said stirrup, a detachable shoe adapted to embrace the peripheral portion of the tire of the wheel adjacent to the tread thereof, said shoe having therein a recess for the occupation of said sleeve and the adjacent portion of said leg, and a pin-like member adapted to pass through the wall of said recess and said sleeve for connecting the shoe with said leg.

2. In a non-skidding attachment for a wheel, a stirrup formed of a crown portion and legs of resilient material connected therewith, said crown portion and the adjacent portions of said legs being adapted to embrace a felly of the wheel, and a detachable shoe on the outer terminal of a leg adapted to bear inwardly against the peripheral portion of the tire of the wheel adjacent the tread thereof, and a pin-like member in said shoe and said terminal of the leg adapting the shoe to be connected with the tire and removed therefrom.

3. In a non-skidding attachment for a wheel, a stirrup of resilient material connectible with a felly of the wheel, the terminal of a leg of said stirrup having thereon a sleeve, a shoe of suitable material, the same having thereon a recess adapted to receive said sleeve and the adajcent portion of said leg, the sides of said recess forming shoulders for the abutment therewith of the ends of said sleeves, and a pin like member for connecting the shoe with said leg adapted to be passed through said sleeve and the shouldered portions of the shoe.

4. In a non-skidding attachment for a wheel, a stirrup of resilient material connectible with a felly of the wheel, the terminal of a leg of said stirrup having thereon a sleeve, a shoe of suitable material, the same having thereon a recess adapted to receive said sleeve and the adjacent portion of said leg, the sides of said recess forming shoulders for the abutment therewith of the ends of said sleeves, and a pin like member for connecting the shoe with said leg adapted to be passed through said sleeve and the shouldered portions of the shoe, said pin member being made removable.

5. A non-skidding attachment for a wheel consisting of a stirrup, the crown portion of the latter being adapted to clasp the felly of the wheel, a shoe on the terminal of a leg of said stirrup adapted to contact with the tire of the wheel adjacent to the tread thereof, said leg having on its terminal a sleeve-like member adapted to enter said shoe, and a connecting pin-like member adapted to pass through said shoe and said sleeve-like member, said shoe having therein in the circular direction thereof a recess parallel with said pin in which said pin is movable in applying the latter to and removing it from operative position.

THOMAS CARROLL DAVIS.

Witnesses:
JOHN A. WIEDERSHEIM,
N. BUSSINGER.